(12) United States Patent
Toda et al.

(10) Patent No.: US 9,236,918 B2
(45) Date of Patent: Jan. 12, 2016

(54) MIMO TRANSMITTING APPARATUS, MIMO RECEIVING APPARATUS, MIMO TRANSMISSION SIGNAL FORMATION METHOD, AND MIMO TRANSMISSION SIGNAL SEPARATION METHOD

(75) Inventors: Takashi Toda, Ishikawa (JP); Masaru Fukuoka, Ishikawa (JP); Sadaki Futagi, Ishikawa (JP); Masayuki Hoshino, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 692 days.

(21) Appl. No.: 12/999,603

(22) PCT Filed: Jun. 23, 2009

(86) PCT No.: PCT/JP2009/002865
§ 371 (c)(1),
(2), (4) Date: Dec. 16, 2010

(87) PCT Pub. No.: WO2009/157184
PCT Pub. Date: Dec. 30, 2009

(65) Prior Publication Data
US 2011/0080975 A1   Apr. 7, 2011

(30) Foreign Application Priority Data

Jun. 24, 2008 (JP) ................................. 2008-164756

(51) Int. Cl.
*H04L 27/00* (2006.01)
*H04L 27/06* (2006.01)
(Continued)

(52) U.S. Cl.
CPC ............... *H04B 7/0413* (2013.01); *H04L 1/06* (2013.01); *H04L 1/1819* (2013.01); *H04L 1/1887* (2013.01)

(58) Field of Classification Search
CPC ......... H04L 1/005; H04L 1/1845; H04L 1/06; H04L 1/1816; H04L 1/1819

USPC .................................................. 375/130–377
See application file for complete search history.

(56) References Cited

U.S. PATENT DOCUMENTS 7,324,429 B2 *   1/2008   Walton et al. ................. 370/203
7,392,460 B2 *   6/2008   Kim et al. ..................... 714/781
(Continued)

FOREIGN PATENT DOCUMENTS

JP   2006-504340   2/2006
WO   WO 2006101213 A1 *   9/2006

OTHER PUBLICATIONS

Samsung, "Code block reordering in HARQ retransmissions" 3GPP TSG RAN WG1 Meeting #50 Athens, Greece, Aug. 20-24, 2007, pp. 1-4.*

(Continued)

*Primary Examiner* — Daniel Washburn
*Assistant Examiner* — Amneet Singh
(74) *Attorney, Agent, or Firm* — Dickinson Wright PLLC

(57) ABSTRACT

A MIMO transmitting apparatus, receiving apparatus, transmission signal formation method, and transmission signal separation method with improved transmission efficiency. In communication apparatus, a mapping unit maps code words into a transmission stream on a per code-block basis and changes, between when a transport block is initially transmitted and when the transport block is retransmitted, the combinations of the code blocks mapped in the same transmission zone. In the communication apparatus, an interference replica generation unit forms, based on the decoded data of successfully decoded code blocks, an interference replica signal corresponding to the successfully decoded code blocks, and a signal separation unit removes, from a plurality of reception streams received this time, the interference replica signal formed by the interference replica generation unit received before the last time reception streams was received and then separates the reception streams received this time into each stream.

6 Claims, 21 Drawing Sheets

(51) Int. Cl.
*H04B 7/04* (2006.01)
*H04L 1/06* (2006.01)
*H04L 1/18* (2006.01)

(56) References Cited

U.S. PATENT DOCUMENTS

| | | | |
|---|---|---|---|
| 7,400,687 B2 * | 7/2008 | Matsumoto et al. | 375/260 |
| 7,764,743 B2 * | 7/2010 | Farag | 375/265 |
| 8,320,486 B2 * | 11/2012 | Kotecha | 375/267 |
| 8,379,738 B2 * | 2/2013 | Pi et al. | 375/260 |
| 2005/0094603 A1 * | 5/2005 | Kim et al. | 370/334 |
| 2007/0030917 A1 * | 2/2007 | Farag | 375/265 |
| 2007/0092020 A1 * | 4/2007 | Seki | 375/267 |
| 2008/0165893 A1 * | 7/2008 | Malladi et al. | 375/299 |
| 2008/0232449 A1 * | 9/2008 | Khan et al. | 375/220 |
| 2009/0028259 A1 * | 1/2009 | Yu et al. | 375/260 |
| 2009/0028263 A1 * | 1/2009 | Yu et al. | 375/267 |
| 2009/0213955 A1 * | 8/2009 | Higuchi et al. | 375/267 |
| 2010/0067459 A1 * | 3/2010 | Goransson et al. | 370/329 |
| 2010/0103901 A1 * | 4/2010 | Miki et al. | 370/330 |

OTHER PUBLICATIONS

International Search Report dated Jul. 28, 2009.
3GPP TSG-RAN WG1 #49, "HARQ performance enhancement," Nortel, R1-072384, May 2007, pp. 1-8.
3GPP TSG RAN WG1 Meeting #50, "Code block reordering in HARQ retransmissions," Samsung, R1-073579, Aug. 2007, pp. 1-4.

* cited by examiner

TRANSPORT BLOCK

MIMO TRANSMITTING APPARATUS, MIMO RECEIVING APPARATUS, MIMO TRANSMISSION SIGNAL FORMATION METHOD, AND MIMO TRANSMISSION SIGNAL SEPARATION METHOD

TECHNICAL FIELD

The present invention relates to a MIMO transmitting apparatus, MIMO receiving apparatus, MIMO transmission signal forming method and MIMO transmission signal separating method.

BACKGROUND ART

As a conventional technique of improving the reliability of communication, error correction coding is used. Also, as such another technique, a retransmission technique (e.g. HARQ (Hybrid-Automatic Repeat reQuest)) of retransmitting data that could not be decoded on the receiving side, is used.

In 3GPP, HARQ retransmission control is performed in TB (Transport Block) units. This transport block is formed with a CB (Code Block) group that is an error correction coding unit.

FIG. 1 illustrates a transport block forming method.

As shown in FIG. 1, first, a CRC (Cyclic Redundancy Check) is attached to a transport block data sequence. Then, the data sequence with a CRC is divided into a plurality of partial data sequences corresponding to code blocks, and a CRC is attached to each of the resulting code blocks.

Next, the plurality of code blocks are subjected to error correction coding and rate matching processing (such as puncturing and repetition), and then combined. Thus, the transport block shown in FIG. 2 is formed.

This transport block subjected to that coding processing is transmitted as a codeword, and the receiving side of this codeword performs reception processing supporting the processing explained using FIG. 1. That is, first, decoding processing is applied to the received codeword. Then, whether or not the received codeword contains error is decided (i.e. CRC check) using CRC's attached to the transport block (including the CRC attached to each code block).

As a result of this CRC check, while an ACK is reported from the receiving side to the transmitting side in the case of "OK" (i.e. in the case where there is no error), a NACK is transmitted in the case of "NG" (i.e. in the case where there is error). Here, this NACK indicates whether or not there is error in transport block units, and does not indicate whether or not there is error in code block units.

Then, upon receiving a NACK, the transmitting side retransmits the transport block for this NACK.

As described above, by using a transport block as a retransmission control unit, when a CRC check result related to any code block is "NG," the receiving side can stop reception processing such as decoding processing for the remaining code blocks. Therefore, the receiving side can eliminate needless processing, so that it is possible to reduce power consumption.

Further, by using a transport block as a retransmission control unit, it is possible to reduce the amount of signaling related to retransmission control, compared to the case of using a code block as a retransmission unit. Signaling related to retransmission control refers to, for example, an ACK/NACK signal, the process number attached to a retransmission unit, and so on.

Also, as a technique used in 3GPP LTE, there is MIMO (Multiple Input Multiple Output). Non-Patent Literature discloses a technique of transmitting a transport block in 4×4 MIMO. FIG. 3 is a block diagram showing a configuration of a MIMO transmitting apparatus adopting the transmission technique disclosed in Non-Patent Literature 1.

In FIG. 3, a transport block (codeword) formed in an encoding section is received as input in an S/P section (serial-to-parallel conversion section). Then, the S/P section separates a plurality of code blocks included in the transport block individually and maps the plurality of partial code blocks, which are obtained from one code block, in respective streams. In FIG. 4, partial code blocks #1A and #2B of code block #1 are mapped in streams #1 and stream #2, respectively.

This MIMO transmitting apparatus adopts the above retransmission control, and therefore can decide a success or failure of transmission only in transport block units. Therefore, upon receiving a NACK, this MIMO transmitting apparatus retransmits all code blocks forming the transport block.

By the way, in MIMO communication, there is a case where communication quality varies between streams depending on the transmission environment. Therefore, if a transport block mapping pattern for a plurality of streams is fixed, a ease is possible where error repeats occurring in a specific part of the transport block.

To solve this problem, Non-Patent Literature 1 suggests a MIMO transmission method of switching mapped signals between streams every retransmission. That is, as shown in FIG. 5, upon the initial transmission, code blocks #1A, #2A, #3A and #4A, which are partial code blocks, are mapped in stream #1, and code blocks #1B, #2B, #3B and #4B, which are partial code blocks, are mapped in stream #2. By contrast with this, in the first retransmission, code blocks #1A, #2A, #3A and #4A, which are mapped in stream #1 in the initial transmission, are mapped in stream #2.

Thus, by switching mapped signals between streams every retransmission, the reliability of symbols in an arbitrary code block is averaged. By this means, it is possible to reduce the possibility that error due to the imbalance of communication quality between streams, repeats occurring in a specific part.

CITATION LIST

Non-Patent Literature

[NPL]
R1-072384, "HARQ performance enhancement", Nortel, Kobe, Japan, 7-11 May 2007

SUMMARY OF INVENTION

Technical Problem

However, with the above conventional MIMO transmission method, although the reliability of symbols in a code block is averaged, reliability is not averaged among code blocks, and therefore there is a high possibility that error repeats occurring in a specific code block. As a result of this, there is a problem of reducing the efficiency of transmission.

It is therefore an object of the present invention to provide a MIMO transmitting apparatus, MIMO receiving apparatus, MIMO transmission signal forming method and MIMO transmission signal separating method for improving the efficiency of transmission by averaging reliability among code blocks.

Solution to Problem

The MIMO transmitting apparatus of the present invention that transmits a transport block including a plurality of code blocks each formed with a data sequence, using a plurality of transmission streams, employs a configuration having: an encoding section that forms a codeword by encoding the transport block in code block units; and a mapping section that maps the codeword in the plurality of transmission streams and changes, between a previous transmission and a current transmission of the transport block, a combination of code blocks to which a plurality of items of symbol data mapped in a same symbol zone belong.

The MIMO receiving apparatus of the present invention that separates a plurality of reception streams in which a transport block including a plurality of code blocks each formed with a data sequence is mapped, into individual streams, and that decodes the separated streams in code block units, employs a configuration having: a forming section that forms an interference replica signal for a code block that was decoded successfully, based on decoded data of that code block; and a separating section that removes a replica signal formed in the forming section before a previous reception, from a plurality of reception streams that are currently received, and then separates these reception streams into individual streams.

The MIMO transmission signal forming method of the present invention includes: a forming step of forming a codeword by encoding a transport block including a plurality of code blocks each formed with a data sequence, in code block units; and a step of forming a MIMO signal by mapping the codeword in a plurality of transmission streams, where a combination of code blocks, to which a plurality of items of symbol data mapped in a same symbol zone in the MIMO signal belong, varies between a previous transmission and a current transmission.

The MIMO transmission signal separating method of the present invention of separating a plurality of reception streams in which a transport block including a plurality of code blocks each formed with a data sequence is mapped, into individual streams, and decoding the separated streams in code block units, includes the steps of: forming an interference replica signal for a code block that was successfully decoded, based on decoded data of that code block; removing an interference replica signal formed in the forming step before a previous reception, from a plurality of reception streams that are currently received; and separating the plurality of reception streams that are currently received, from which the interference replica signal is removed, into individual streams.

Advantageous Effects of Invention

According to the present invention, it is possible to provide a MIMO transmitting apparatus, MIMO receiving apparatus, MIMO transmission signal forming method and MIMO transmission signal separating method for improving the efficiency of transmission by averaging reliability among code blocks.

DESCRIPTION OF EMBODIMENTS

Figure 1:
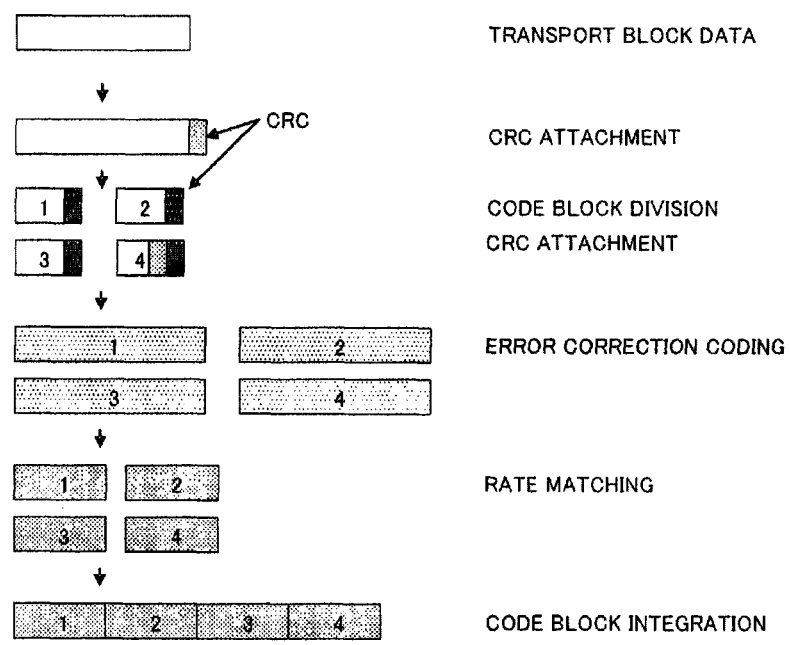
FIG. 1 illustrates a transport block forming method.
Figure 2:
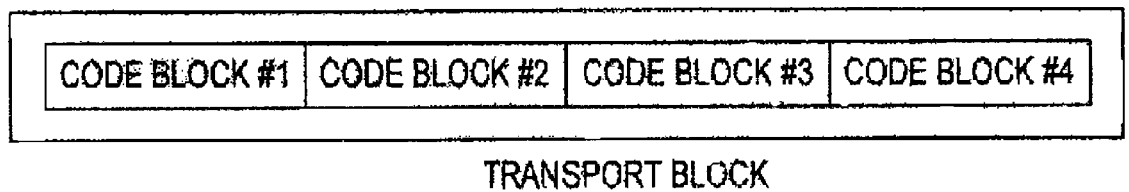
FIG. 2 shows a configuration of a transport block.
Figure 3:
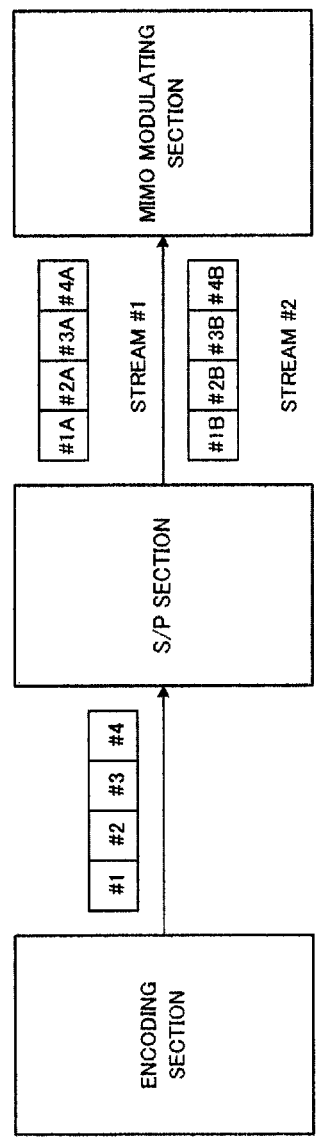
FIG. 3 is a block diagram showing a configuration of a conventional MIMO transmitting apparatus.
Figure 4:
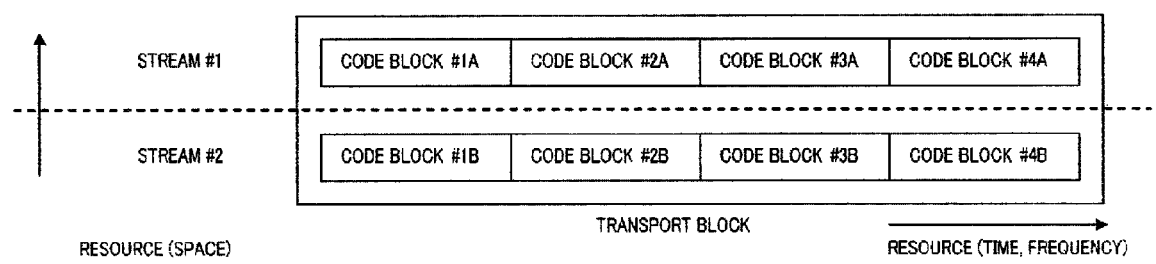
FIG. 4 illustrates a mapping method in the MIMO transmitting apparatus of FIG. 3.
Figure 5:
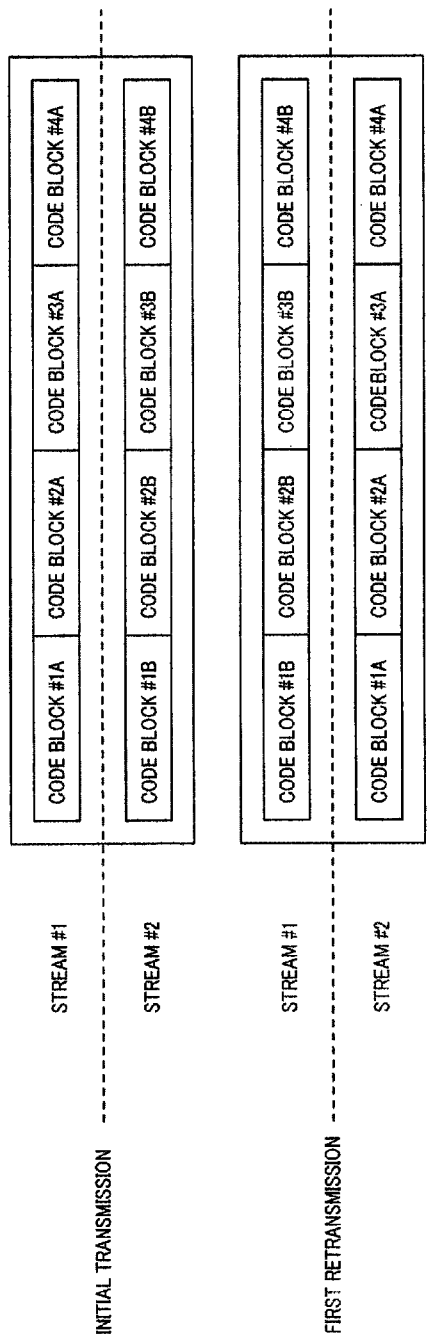
FIG. 5 shows an example of a conventional mapping pattern.

Now, embodiments of the present invention will be explained in detail with reference to the accompanying drawings. Here, in embodiments, the same components will be assigned the same reference numerals and their explanation will be omitted.

(Embodiment 1)

Figure 6:
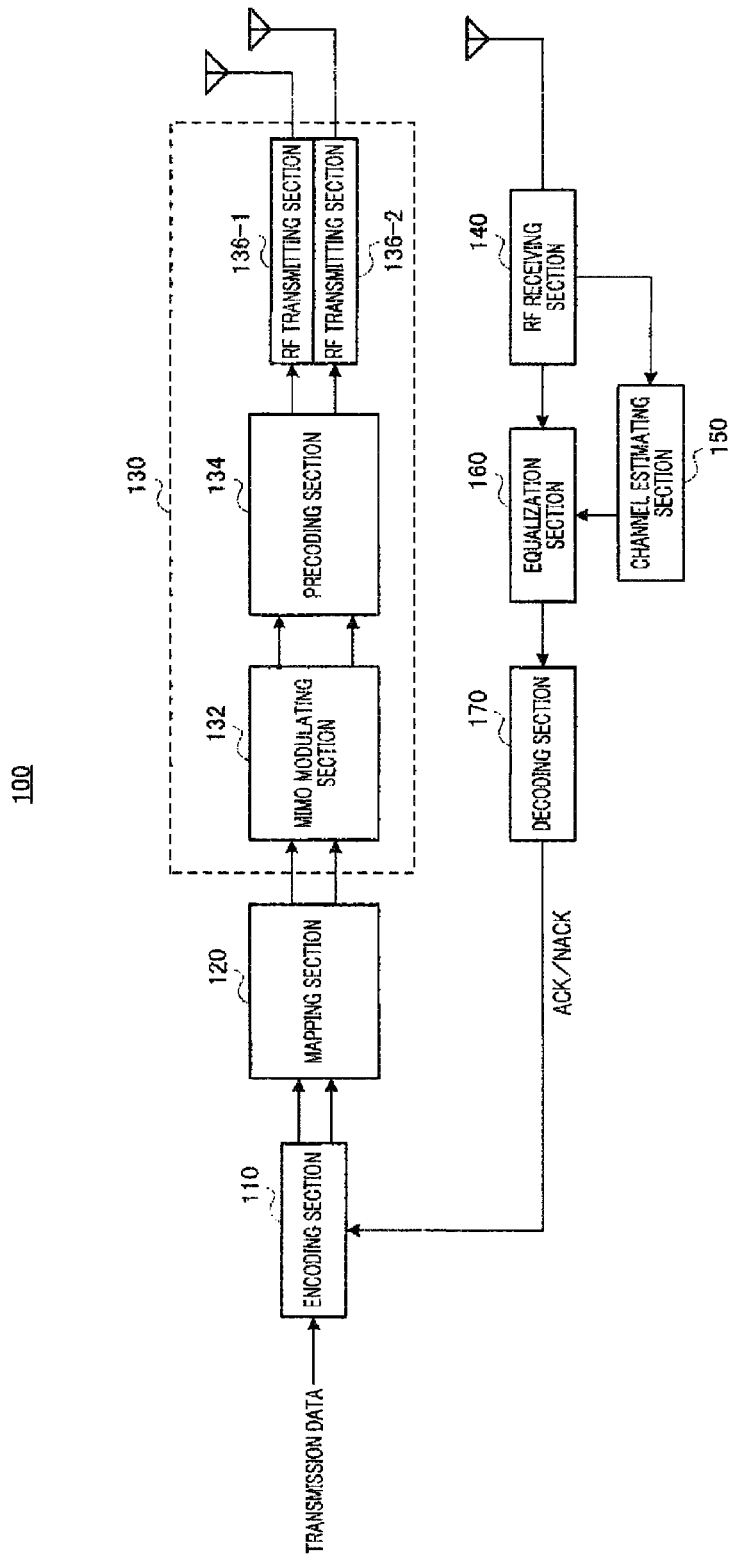
FIG. 6 is a block diagram showing a configuration of a MIMO communication apparatus on the transmitting side according to Embodiment 1 of the present invention.

FIG. 6 is a block diagram showing a configuration of a MIMO communication apparatus on the transmitting side according to Embodiment 1. MIMO communication apparatus 100 shown in FIG. 6 transmits a transport block including a plurality of code blocks each formed with a data sequence, using a plurality of transmission streams. For ease of explanation, although a case will be explained below where two transmission streams are used to transmit a transport block, the number of transmission streams is not limited to this, and may be three or more.

In FIG. 6, MIMO communication apparatus 100 is provided with encoding section 110, mapping section 120, MIMO transmitting section 130, RF receiving section 140, channel estimating section 150, equalization section 160 and decoding section 170. MIMO transmitting section 130 is provided with MIMO modulating section 132, precoding section 134 and RF transmitting section 136.

Figure 7:
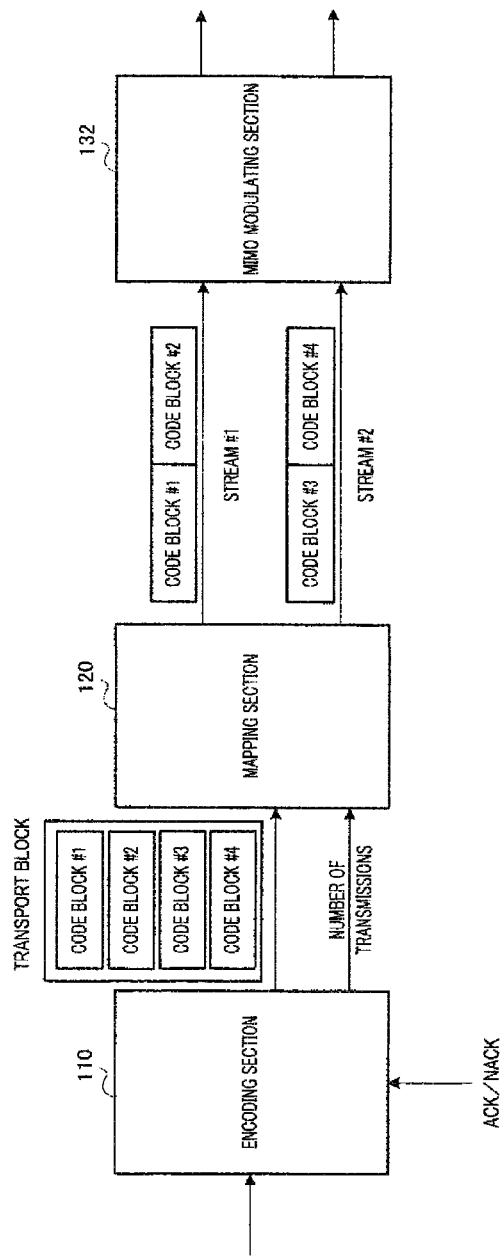
FIG. 7 shows an encoding section, mapping section and MIMO modulating section and illustrates input signals and output signals of these functional sections among the functional sections provided in the MIMO communication apparatus of FIG. 6.

FIG. 7 shows encoding section 110, mapping section 120 and MIMO modulating section 132 and illustrates input signals and output signals of these functional sections among the functional sections provided in MIMO communication apparatus 100.

Encoding section 110 receives as input a transport block including a plurality of code blocks of transmission data, and encodes that transport block in code block units. The resulting transport block subjected to coding processing is held in a memory (not shown) and outputted to mapping section 120 as a codeword.

Also, encoding section 110 receives as input an ACK or NACK from decoding section 170 and outputs the transport block for the ACK or NACK.

That is, upon receiving a NACK as input, encoding section 110 outputs a codeword held in the memory to mapping section 120 again. Thus, retransmission processing is performed. Also, encoding section 110 has a counter (not shown) that counts the number of times a NACK related to one transport block is received, and outputs the counter value (i.e. transmission count information) to mapping section 120 every time a NACK is received.

In contrast, upon receiving an ACK as input, encoding section 110 encodes the transport block next to the codeword held in the memory, in code block units.

Mapping section 120 receives a codeword as input and maps that codeword in a plurality of transmission streams. Here, as shown in FIG. 7, mapping section 120 maps the codeword in transmission streams in code block units. That is, in FIG. 7, regarding code blocks #1 to #4 included in the same transport block, mapping section 120 maps code blocks #1 and #2 in streams 1 and maps code blocks #3 and #4 in stream 2.

Also, mapping section 120 changes, between the initial transmission and a retransmission of a transport block, the combination of code blocks mapped in the same transmission zone. Mapping section 120 outputs mapping pattern information in the current transmission before the transport block. By decoding this mapping pattern information, the receiving side can specify the mapping pattern of the transport block that is transmitted after the mapping pattern information.

Figure 8:
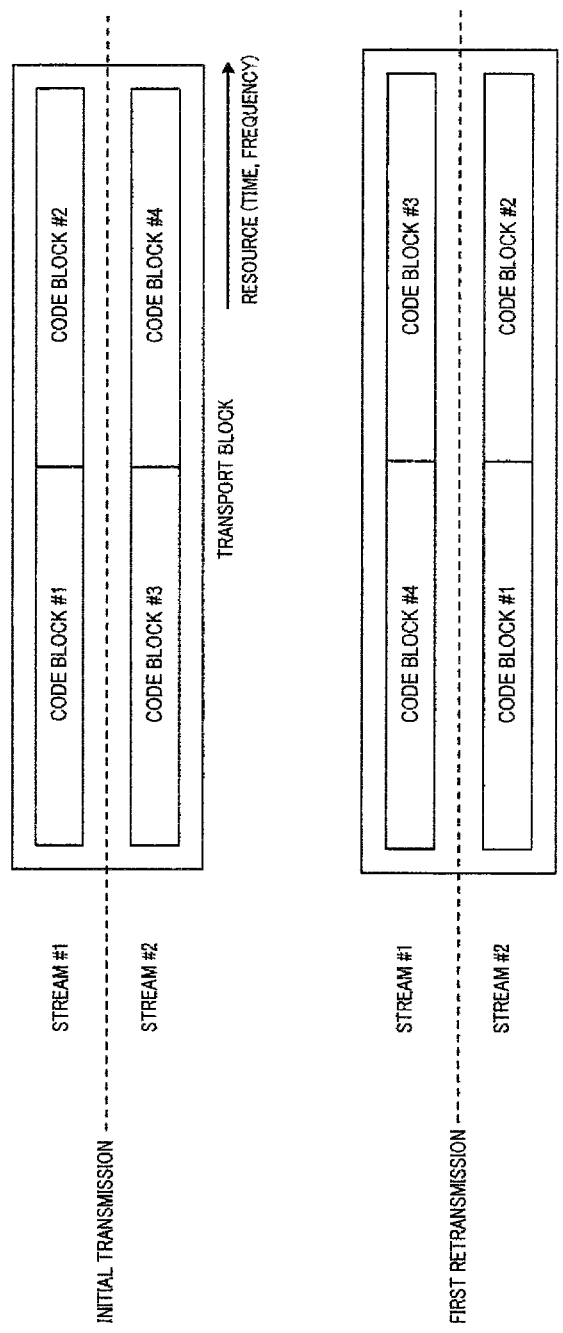
FIG. 8 shows an example of a code block mapping pattern in the initial transmission and a retransmission of a transport block.

FIG. 8 shows an example of code block mapping patterns in the initial transmission and a retransmission of a transport block.

In FIG. 8, for the mapping pattern upon the initial transmission, first, mapped code blocks are switched between streams, and, next, the order of code blocks mapped in stream 1 is reversed in the time domain (or in the frequency domain).

MIMO transmitting section 130 receives as input a transport block outputted from mapping section 120 and forms a MIMO transmission signal from that transport block. To be more specific, in MIMO transmitting section 130, MIMO modulating section 132 receives as input code blocks mapped in streams and forms MIMO modulation signals by performing modulation processing per stream. This modulation processing uses a modulation scheme such as QPSK and QAM. Also, precoding section 134 multiplies the MIMO modulation signals outputted from MIMO modulating section 132 by weights for beam forming. Then, RF transmitting section 136 performs radio transmission processing such as D/A conversion, up-conversion and amplification on each stream. In this case, two streams are used, and therefore RF transmitting sections 136-1 and 136-2 are provided.

The MIMO transmission signals formed as above are transmitted from a plurality of antennas.

RF receiving section 140 performs radio reception processing such as amplification, down-conversion and A/D conversion on a signal received at a receiving antenna.

Channel estimating section 150 estimates the variation in the channel based on known symbols included in the received signal.

Equalization section 160 performs equalization processing of the received signal using the channel estimation value obtained in channel estimating section 150.

Decoding section 170 performs, for example, error correction decoding of the equalized signal and outputs ACK/NACK information fed back from the MIMO receiving apparatus (described later).

Figure 9:
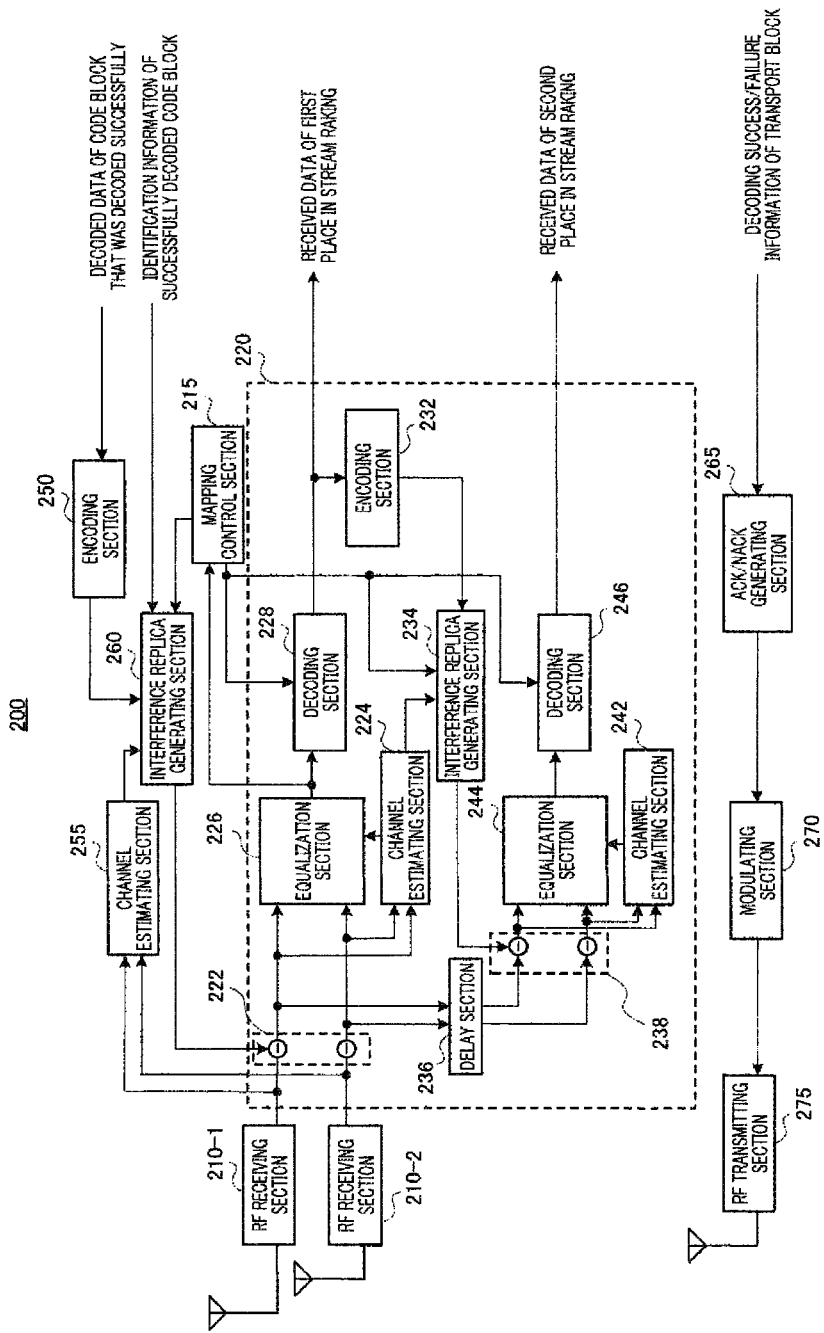
FIG. 9 is a block diagram showing a configuration of a MIMO communication apparatus on the receiving side according to Embodiment 1.

FIG. 9 is a block diagram showing a configuration of the MIMO communication apparatus on the receiving side according to Embodiment 1.

MIMO communication apparatus 200 shown in FIG. 9 receives a plurality of streams which are transmitted from MIMO communication apparatus 100 and in which a transport block including a plurality of code blocks each formed with a data sequence is mapped. Then, MIMO communication apparatus 200 separates the plurality of streams into individual streams and decodes those separated streams in code block units. Here, in line with MIMO communication apparatus 100, a case will be explained where there are two reception streams.

In FIG. 9, MIMO communication apparatus 200 is provided with RF receiving section 210, mapping control section 215, signal separating section 220, encoding section 250 channel estimating section 255, interference replica generating section 260, ACK/NACK generating section 265, modulating section 270 and RF transmitting section 275.

RF receiving section 210 performs radio reception processing such as amplification, down-conversion and A/D conversion on the signal received at each receiving antenna.

Mapping control section 215 decodes a received signal and outputs mapping pattern information included in the received signal to interference replica generating section 260 and signal separating section 220.

If the current transmission is the initial transmission or there is no code block that was decoded successfully (i.e. code block without error in the decoding result) before the current retransmission, signal separating section 220 separates the plurality of reception streams that are currently received, into individual streams in order from the stream of the highest place in the stream ranking, based on the mapping information received from mapping control section 215.

In contrast, if there is a code block that was decoded successfully before the current retransmission, signal separating section 220 removes an interference replica generated in interference replica generating section 260, from the plurality of reception streams that are currently received, and then separates the plurality of resulting reception streams into individual streams.

In FIG. 9, signal separating section 220 is provided with subtraction processing section 222 including a plurality of subtractors provided for respective reception streams, channel estimating section 224, equalization section 226, decoding section 228, encoding section 232, interference replica generating section 234, delay section 236, subtraction processing section 23S, channel estimating section 242, equalization section 244 and decoding section 246.

Subtraction processing section 222 subtracts an interference replica from a plurality of reception streams received from RF receiving section 210, and outputs the plurality of resulting streams to channel estimating section 224, equalization section 226 and delay section 236.

Channel estimating section 224 estimates the variation in the transmission path, from known symbols in the received signals.

Equalization section 226 performs equalization processing of the received signals using the channel estimation value obtained in channel estimating section 224.

Decoding section 228 decodes a turbo code, for example.

Encoding section 232 performs the same coding processing (e.g. turbo coding) as in encoding section 110 on the transmitting side, on code data obtained in decoding section 228.

Interference replica generating section 234 forms an interference replica signal for code blocks mapped in the stream of the first place in the stream ranking, based on decoded data of successfully decoded code blocks obtained in encoding section 232, mapping pattern information from mapping control section 215 and the channel estimation value obtained in channel estimating section 224.

Delay section 236 gives certain delay to the plurality of streams.

Subtraction processing section 238 subtracts the interference replica obtained in interference replica generating section 234, from the plurality of streams delayed in delay section 236, and outputs the plurality of resulting streams to channel estimating section 242 and equalization section 244.

Channel estimating section 242 estimates the variation in the transmission path, from known symbols in the received signals.

Equalization section 244 decodes a turbo code, for example.

Decoding section 246 performs the same coding processing (e.g. turbo coding) as in encoding section 110 on the transmitting side.

Encoding section 250 receives as input a code block that was successfully decoded (i.e. code blocks without error in the decoding result), and applies the same processing as in encoding section 110 on the transmitting side, to that code block.

Channel estimating section 255 estimates the variation in the transmission path, based on known signals included in received signals.

Interference replica generating section 260 forms an interference replica signal for a successfully decoded code block, based on decoded data of the successfully decoded code block obtained in encoding section 250 and the channel estimation value obtained in channel estimating section 255. Interference replica generating section 260 temporarily holds identification information of the successfully decoded code block received as input and an interference replica signal for this identification information.

Based on mapping information received from mapping control section 215, interference replica generating section 260 outputs the interference replica to subtraction processing section 220 at the timing the successfully decoded code block is mapped in a transport block that is currently retransmitted.

ACK/NACK generating section 265 generates an ACK or a NACK based on decoding success/failure information of a transport block received from CRC check sections (not shown) provided in the output stage of decoding sections 228 and 246. The generated ACK (or NACK) is subjected to modulation processing in modulating section 270, subjected to radio transmission processing in RF transmitting section 275 and then transmitted via an antenna.

Operations of a communication system formed with MIMO communication apparatus 100 and MIMO communication apparatus 200 employing the above configurations, will be explained with reference to FIG. 6 to FIG. 10.

In explanation below, presume conditions as follows:

(1) as shown in FIG. 1, one transport block includes four code blocks;

(2) a transport block is transmitted by two streams;

(3) upon both the initial transmission and a retransmission, the communication quality (e.g. SINR) in stream #2 is lower than the communication quality in stream #1; and (4) in the initial transmission, only transmission of code block #1 succeeds and transmissions of other code blocks fail.

First, in MIMO communication apparatus 100, upon the initial transmission, mapping section 120 maps code blocks #1 and #2 in stream #1 and maps code blocks #3 and #4 in stream #2. The combination of code blocks #1 and #3 and the combination of code blocks #2 and #4 refer to combinations of code blocks transmitted by different streams in the same time or frequency. That is, in the spatial domain, code blocks #1 and #3 form one combination, and code blocks #2 and #4 form one combination.

The transport block mapped as above is transmitted to MIMO communication apparatus 200. Then, two transmission streams are overlapped in the transmission path and received in MIMO communication apparatus 200.

In MIMO communication apparatus 200, a plurality of reception streams received at a plurality of antennas are separated into individual streams for respective transmission streams.

That is, first, the first signal separation processing section including equalization section 226 and decoding section 228, extracts the stream of the first place in the stream ranking from the plurality of reception streams. In the stream ranking, normally, streams are ranked in order from the stream of the best communication quality. Therefore, in this case, received data (decoded data) related to stream #1 is outputted from decoding section 228.

Then, in this case, a CRC check section (not shown) provided in the subsequent stage of decoding section 228 decides that there is no error in code block #1 (CRC=OK) and there is error in code block #2 (CRC=NG).

Also, decoded data of stream #1 extracted in equalization section 226 is encoded in encoding section 232. Then, interference replica generating section 234 generates an interference replica based on the encoded data obtained in encoding section 232.

Figure 10:
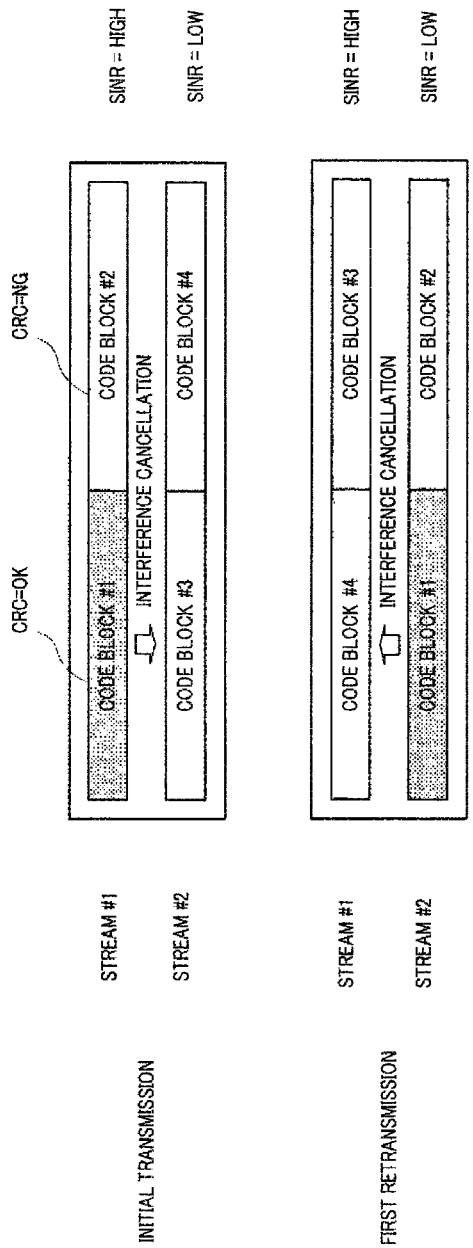
FIG. 10 illustrates operations of a MIMO communication apparatus on the receiving side.

Also, after the plurality of reception streams are delayed in delay section 236, subtraction processing section 238 subtracts the interference replica obtained in interference replica generating section 234, from the delayed reception streams (see FIG. 10). The resulting reception streams, from which the interference replica was subtracted, are extracted in a second signal separation processing section including equalization section 244 and decoding section 246. Here, received data (decoded data) related to stream #2 is outputted from decoding section 246.

Then, here, a CRC check section (not shown) decides that there is error in code blocks #3 and #4.

Then, when there is error even in one of the plurality of code blocks included in the transport block, the CRC check section outputs decoding failure information to ACK/NACK generating section 265, while, only when there is no error in all of the plurality of code blocks, the CRC check section outputs decoding success information to ACK/NACK generating section 265.

A case is assumed here where ACK/NACK generating section 265 receives decoding failure information, and therefore generates and transmits a NACK to MIMO communication apparatus 100.

Upon receiving a NACK, MIMO communication apparatus 100 changes the mapping pattern of code blocks and retransmits the transport block.

That is, in MIMO communication apparatus 100, mapping section 120 changes, between the initial transmission and a retransmission of a transport block, the combination of code blocks, which are mapped in the same transmission zone. In FIG. 8, combinations of code blocks in the spatial domain are changed to the combination of code blocks #4 and #1 and the combination of code blocks #3 and #2. That is, as described above, by switching mapped code blocks between streams and reversing the order of code blocks mapped in the same stream in the time domain (or in the frequency domain), mapping section 120 changes combinations of code blocks in the spatial domain.

Here, upon the initial transmission, code block #1 is successfully decoded, so that code block #3 obtains interference cancellation gain of code block #1. Therefore, even in the case of code blocks mapped in stream #2 of low communication quality, code block #3 has higher reliability than code block #4. Also, from the comparison between code block #2 and code block #4, the communication quality of stream #1 is higher than that of stream #2, and therefore code block #2 has higher reliability. As a result, code block #4 has the lowest reliability.

Therefore, referring to the mapping pattern upon a retransmission shown in FIG. 8, code block #1, which was already decoded successfully, and code block #4 of the lowest reliability form a combination, and code block #3 and code block #2 form a combination. Also, in this mapping pattern, a successfully decoded code block or the code block of the highest reliability is preferentially mapped in a stream of low communication quality.

The transport block mapped as above is transmitted to MIMO communication apparatus 200.

In MIMO communication apparatus 200, a plurality of reception streams received at a plurality of antennas are separated into individual streams for respective transmission streams.

Here, upon a retransmission, if there is a code block that was successfully decoded before the current retransmission, signal separating section 220 removes an interference replica generated in interference replica generating section 260, from the plurality of reception streams that are currently received, and then separates the plurality of resulting reception streams into individual streams.

Here, an interference replica for code block #1 is generated, and, consequently, subtraction processing section 222 removes the interference replica from the plurality of reception streams.

Then, the first signal separation processing section extracts received data related to stream #1, from the plurality of reception streams from which the interference replica is removed.

Here, conventionally, in the same way as in the above initial transmission, an interference replica is generated from decoded data in order from the decoded data of the highest stream in the stream ranking and removed from a plurality of reception streams before a lower stream is extracted, and then a lower stream is extracted.

By contrast with this, regardless of the ranking of streams in which code blocks for interference replicas generated in interference replica generating section 260 are mapped, first, MIMO communication apparatus 200 removes an interference replica generated in interference replica generating section 260 upon the initial transmission and then separates a plurality of reception streams received upon a retransmission into individual streams.

By this means, in signal separation for code block #4, it is possible to provide interference cancellation gain of code block #1.

As described above, according to the present embodiment, in MIMO communication apparatus 100 that uses a plurality of transmission streams to transmit a transport block including a plurality of code blocks each formed with a data sequence, mapping section 120 maps a codeword in transmission streams in code block units and changes, between the initial transmission and a retransmission of the transport block, the combination of code blocks mapped in the same transmission zone. That is, referring to a symbol zone, mapping section 120 maps a codeword in a plurality of transmission streams and changes, between the initial transmission and a retransmission of the transport block, the combination of code blocks to which a plurality of items of symbol data mapped in the same symbol zone belong.

By this means, reliability among code blocks is averaged by retransmission. Especially, if the receiving side adopts an interference canceller, it is possible to increase the probability that a code block of poor received quality upon the previous transmission obtains interference cancellation gain. By this means, it is possible to reduce the number of retransmissions, so that it is possible to improve the efficiency of transmission.

Also, mapping section 120 switches mapping destination transmission streams for a plurality of code blocks, between the initial transmission and a retransmission.

By this means, even if there is a difference of communication quality between transmission streams, it is possible to average reliability among code blocks.

Also, according to the present embodiment, a plurality of reception streams, in which a transport block including a plurality of code blocks each formed with a data sequence is mapped, is separated into individual streams. Further, in MIMO communication apparatus 200 that decodes the separated streams in code block units, interference replica generating section 260 forms an interference replica signal for a code block that was successfully decoded, based on decoded data of the successfully decoded code block, and signal separating section 220 removes the interference replica signal formed in interference replica generating section 260 before the previous reception, from a plurality of reception streams that are currently received, and then separates the plurality of resulting reception streams into individual streams.

By this means, upon separating a plurality of reception streams from which an interference replica signal is removed, it is possible to obtain interference cancellation gain reliably. Therefore, the accuracy of signal separation improves, and, as a result, it is possible to reduce the number of retransmissions. By this means, it is possible to improve the efficiency of transmission.

Here, with the technique disclosed in above Non-Patent Literature 1, in each symbol zone, symbol data belonging to the same code block is mapped in a plurality of streams, and, consequently, the receiving side cannot adopt an interference canceller itself.

Also, a case has been described with above explanation, where mapping destination transmission streams for a plurality of code blocks are switched and the order of code blocks mapped in transmission streams are reversed. By contrast with this, only by reversing the order of code blocks in part of transmission streams, it is possible to change, between the initial transmission and a retransmission of the transport block, the combination of code blocks mapped in the same transmission zone. By this means, if there is no difference of communication quality between transmission streams, it is equally possible to average the reliability sufficiently among code blocks.

Also, although a case has been primary described with above explanation where the combination of code blocks mapped in the same transmission zone is changed between the initial transmission and a retransmission, the present invention is not limited to this, and it is equally possible to change, between the previous transmission (including the initial transmission) and the current transmission, the combination of code blocks mapped in the same transmission zone.

Figure 11:
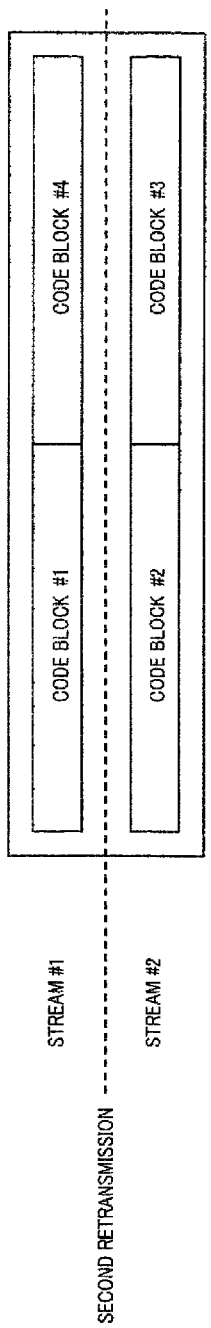
FIG. 11 shows an example of a mapping pattern upon a second retransmission.

Further, it is equally possible to use different code block combinations among all retransmissions. That is, in this case, upon a second retransmission after the first retransmission in FIG. 8, for example, a transport block with the mapping pattern shown in FIG. 11 is transmitted.

By this means, as more retransmissions are performed, reliability is further averaged among code blocks. Especially, if the receiving side adopts an interference canceller, a code block of poor received quality upon the previous transmission is more likely to obtain interference cancellation gain. By this means, it is possible to reduce the number of retransmissions and therefore improve the efficiency of transmission.

Figure 12:
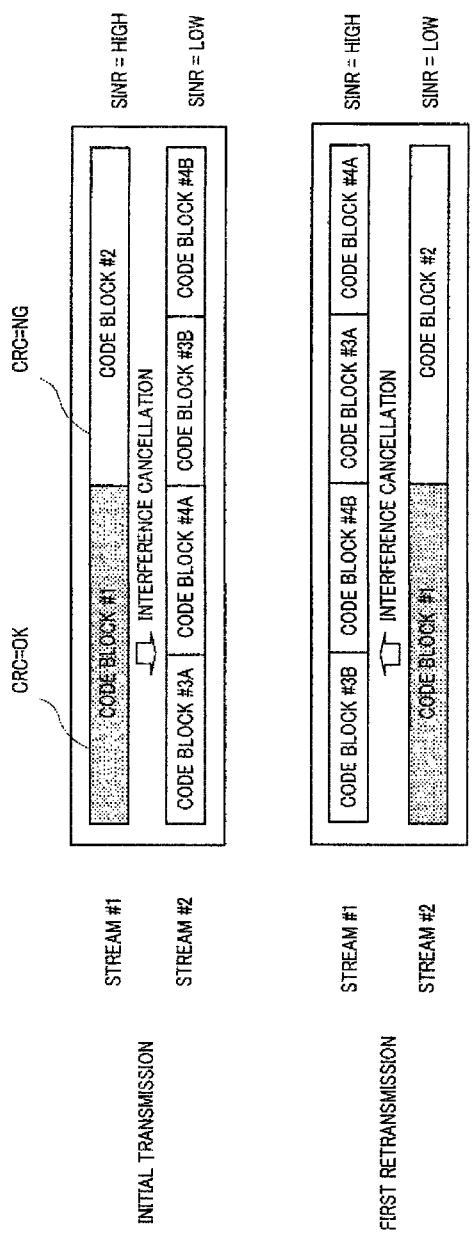
FIG. 12 shows another example of a mapping pattern.

Also, although a case has been described with above explanation where one code block and one code block form a combination, as shown in FIG. 12, it is equally possible to form the combination of one code block and partial code blocks of a plurality of code blocks. In FIG. 12, if code block #3A and code block #4A are used as one original code block and code block #3B and code block #4B are used as one original code block, the above case is equivalent to a case where one code block and one code block form a combination. By this means, even in the case of FIG. 12, the combination of code blocks mapped in the same transmission zone is changed between the previous transmission (including the initial transmission) and the current transmission.

Also, upon the initial transmission, mapping section 120 may preferentially combine a plurality of code blocks among which there is an error characteristic difference. That is, upon the initial transmission, mapping section 120 may make in advance an error characteristic difference between transmission streams. As a combination of a plurality of code blocks among which there is an error characteristic difference, for example, there is the combination of a code block, which is likely to be erroneous because the number of constitution bits is small, and a code block, which is less likely to be erroneous because the number of constitution bits is large, or the combination of a code block, which is likely to be erroneous because the number of filler bits included in constitution hits is small, and a code block, which is less likely to be erroneous because the number of filler bits included in constitution bits is large.

By this means, it is possible to increase the possibility that a code block, which is likely to be erroneous, obtains interference cancellation gain using an interference replica obtained from a code block, which is less likely to be erroneous (i.e. a code block which is likely to be decoded successfully).

Also, although a case has been described with above explanation where mapping pattern information is included in a transmission signal of MIMO communication apparatus 100, the present invention is not limited to this, and it is equally possible to share in advance a change pattern of mapping patterns between MIMO communication apparatus 100 and MIMO communication apparatus 200. In this case, MIMO communication apparatus 200 has a counter (not shown) that counts the number of times a NACK is transmitted, and outputs the count value to mapping control section 215 every time a NACK is transmitted. Then, based on this count value, mapping control section 215 specifies a mapping pattern.

Also, although a case has been described with above explanation where one transport block includes four code blocks, the number of code blocks included in one transport block is not limited to this.

When the number of code blocks included in a transport block is large, it is possible to divide a code block group into some groups and change the combination of code blocks upon a retransmission in each group.

By this means, the receiving side can start decoding processing in group units before receiving the entire transport block upon a retransmission, so that it is possible to start decoding processing earlier and perform pipeline processing.

Also, although signal separating section 220 employs a configuration for interference cancellation (i.e. a configuration to which SIC (Successive Interference Cancellation) is applied), the present invention is not limited to this, and it is equally possible to employ a configuration to perform MLD (Maximum Likelihood Detection).

(Embodiment 2)

In Embodiment 2, as in Embodiment 1, a transport block including a plurality of code blocks each formed with a data sequence is transmitted using a plurality of streams.

However, while a transport block (codeword) is mapped in transmission streams in code block units in Embodiment 1, a transport block (codeword) is mapped in transmission streams in symbol units in Embodiment 2.

Figure 13:
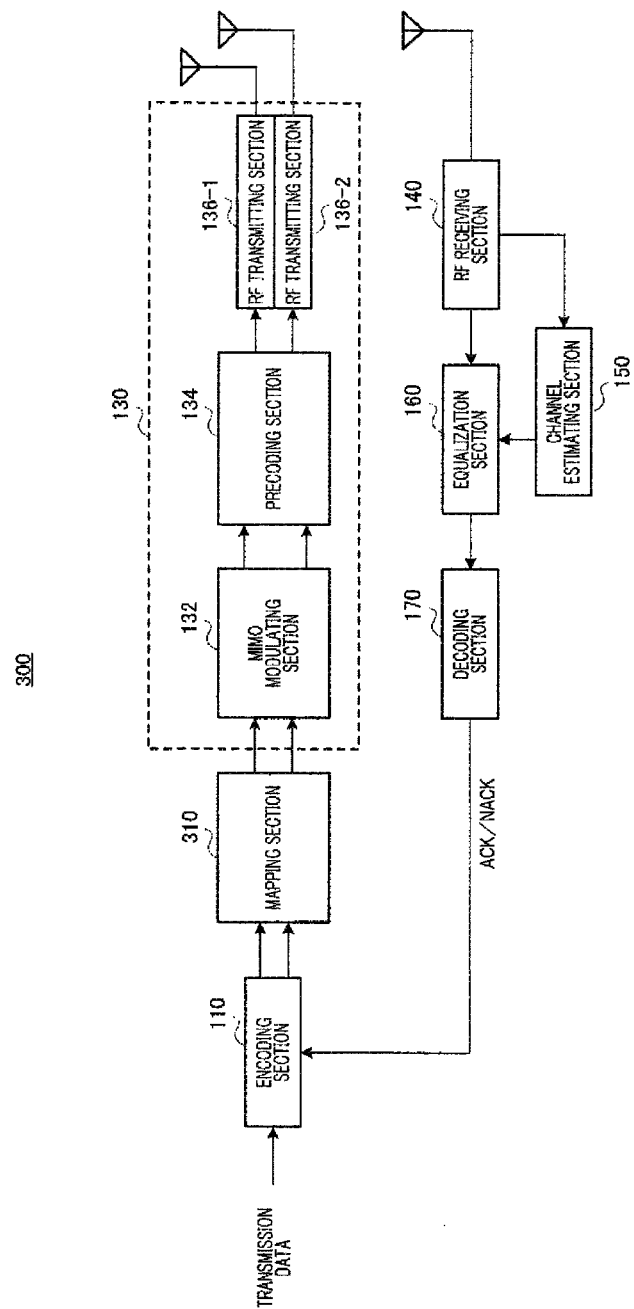
FIG. 13 is a block diagram showing a configuration of a MIMO communication apparatus on the transmitting side according to Embodiment 2 of the present invention.

FIG. 13 is a block diagram showing a configuration of the MIMO communication apparatus on the transmitting side according to Embodiment 2. In FIG. 13, MIMO communication apparatus 300 includes mapping section 310.

Figure 14:
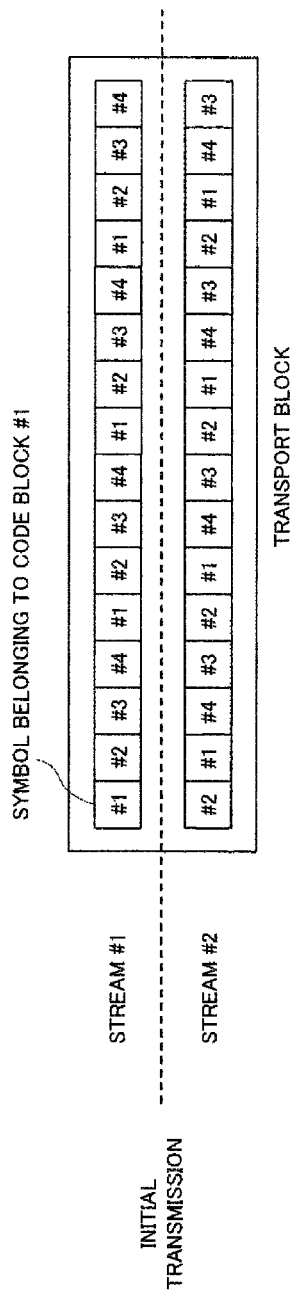
FIG. 14 shows an example of a code block mapping pattern upon the initial transmission of a transport block.

Mapping section 310 receives a codeword as input and maps that codeword in a plurality of transmission streams. Here, as shown in FIG. 14, mapping section 310 maps the codeword in the transmission streams in symbol units. Also, in FIG. 14, #1, #2, #3 and #4 represent symbols forming code blocks #1, #2, #3 and #4, respectively. That is, in FIG. 14, symbols forming the same code block are mapped both in stream #1 and stream #2. Also, in the same symbol zone, symbols belonging to different code blocks are mapped. For example, in the first symbol zone in FIG. 14, a symbol belonging to code block #1 is mapped in stream #1 and a symbol belonging to code block #2 is mapped in stream #2. That is, in the same symbol resource, mapping section 310 maps different code block symbols in the spatial domain.

Also, mapping section 310 changes, between the initial transmission and a retransmission of a transport block, the combination of code blocks mapped in the same symbol zone.

Figure 15:
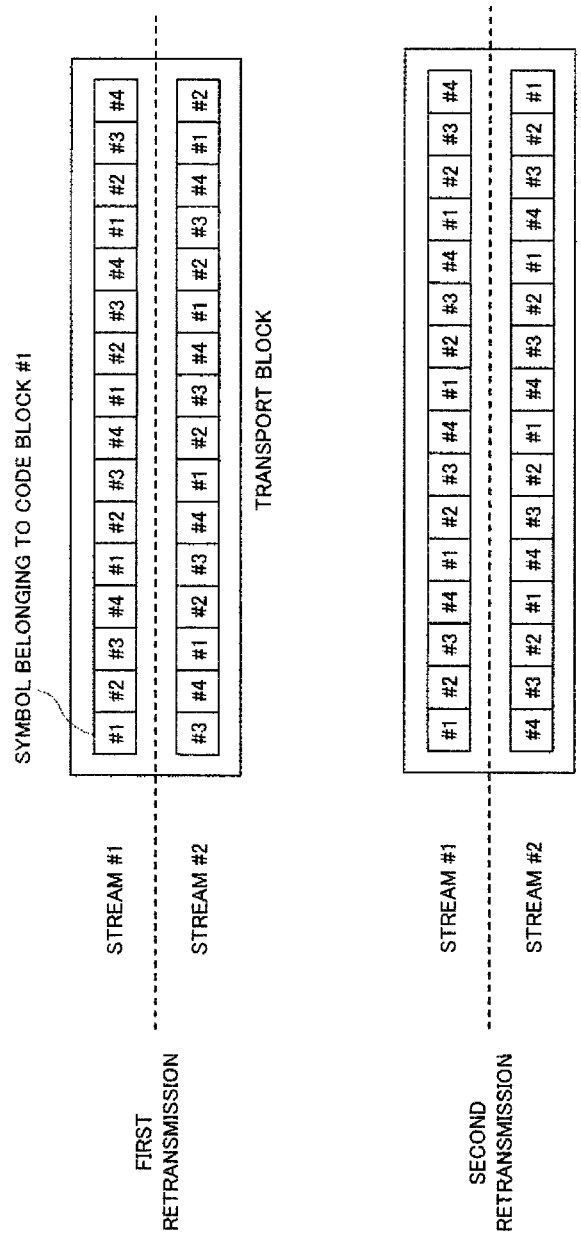
FIG. 15 shows an example of code block mapping patterns in the first retransmission and a second retransmission of a transport block.

FIG. 15 shows an example of code block mapping patterns between the first retransmission and a second retransmission of a transport block.

In FIG. 15, compared to the mapping pattern upon the initial transmission in FIG. 14, the order of symbols mapped in stream #2 is changed. That is, while symbols #2, #1, #4 and #3 are sequentially mapped in the head of stream #2, in FIG. 15, symbols are mapped in order from symbols #3, #4, #1 to #2 upon the first retransmission, Upon a second retransmission, the order of symbols mapped in stream 2 is further changed.

Thus, according to the present embodiment, in MIMO communication apparatus 300 that uses a plurality of transmission streams to transmit a transport block including a plurality of code blocks each formed with a data sequence, mapping section 310 maps a codeword in a plurality of transmission streams and changes, between the initial transmission and a retransmission of a transport block, the combination of code blocks to which a plurality of items of symbol data mapped in the same symbol zone belong.

By this means, it is possible to provide a spatial diversity effect and average reliability among code blocks by retransmission. By this means, it is possible to reduce the number of retransmissions and improve the efficiency of retransmission.

Also, although a case has been described with above explanation where one transport block includes four code blocks, the number of code blocks included in one transport block is not limited to this.

Figure 16:
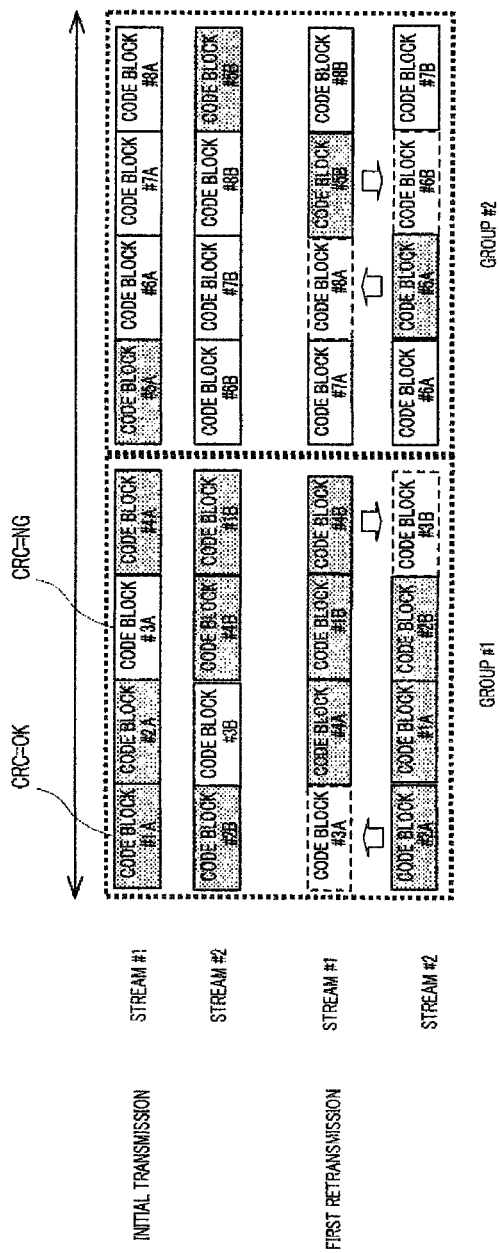
FIG. 16 shows another example of code block mapping patterns upon the initial transmission and a retransmission of a transport block.

When the number of code blocks included in a transport block is large, it is possible to divide a code block group into some groups and change the combination of code blocks upon a retransmission in each group. In FIG. 16, code blocks #1, #2, #3 and #4 form group #1, and code blocks #5, #6, #7 and #8 form group #2.

By this means, the receiving side can start decoding processing in group units before receiving the entire transport block upon a retransmission, so that it is possible to start decoding processing earlier and perform pipeline processing.

(Embodiment 3)

In Embodiments 1 and 2, the MIMO communication apparatus on the transmitting side changes combinations of code blocks autonomously between the initial transmission and a retransmission, or changes the combinations between the initial transmission and a retransmission according to the pattern change order determined in advance between the MIMO communication apparatus on the transmitting side and the MIMO communication apparatus on the receiving side.

By contrast with this, in Embodiment 3, the MIMO communication apparatus on the receiving side determines a changed code block allocation pattern and feeds back information of the determined code block pattern to the MIMO communication apparatus on the transmitting side.

Also, as in Embodiment 1, a case will be explained below where a transport block is mapped in a plurality of transmission streams in code block units.

Figure 17:
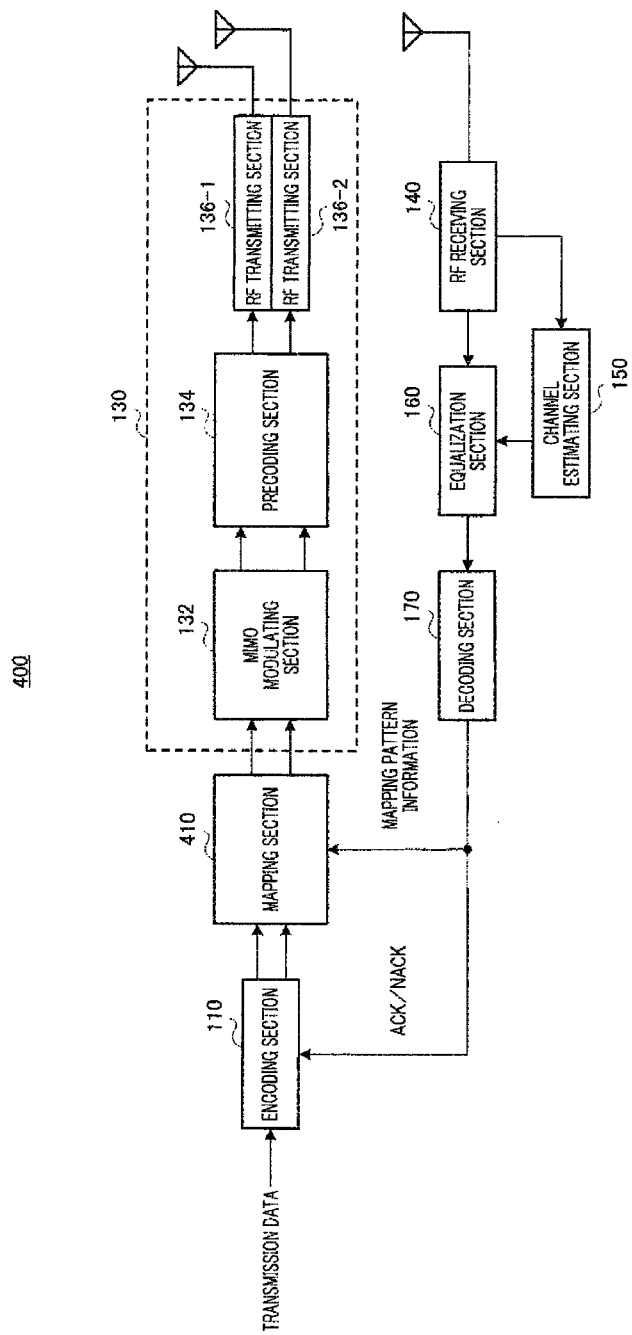
FIG. 17 is a block diagram showing a configuration of a MIMO communication apparatus on the transmitting side according to Embodiment 3.

FIG. 17 is a block diagram showing a configuration of the MIMO communication apparatus on the transmitting side according to Embodiment 3. In FIG. 17, MIMO communication apparatus 400 includes mapping section 410.

Figure 18:
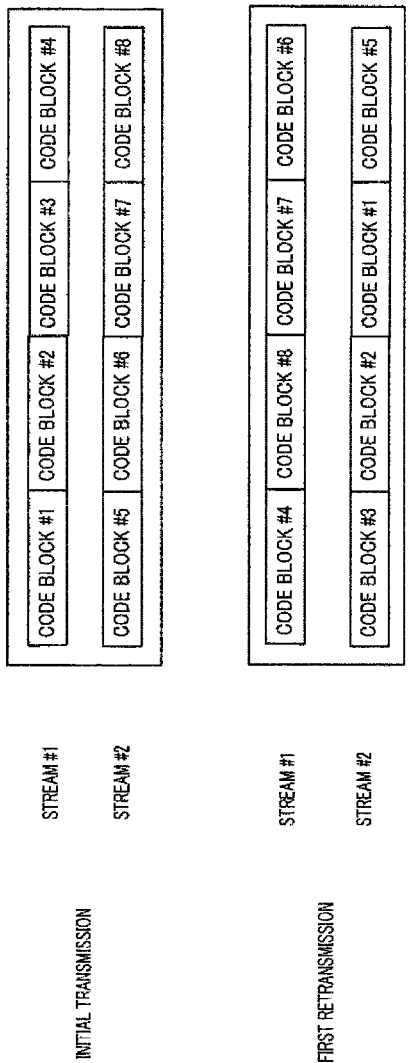
FIG. 18 shows a variation example of a mapping pattern in a case where the number of shifts indicated by mapping pattern information is three.

Mapping section 410 receives as input mapping pattern information decoded in decoding section 170, and, based on this mapping pattern information, changes the mapping pattern of code blocks between the initial transmission and a retransmission. This mapping pattern information refers to, for example, the number of shifts. FIG. 18 shows a mapping pattern change example in a case where the number of shifts indicated by mapping pattern information is three. In particular, FIG. 18 shows a case of counterclockwise shifts.

Figure 19:
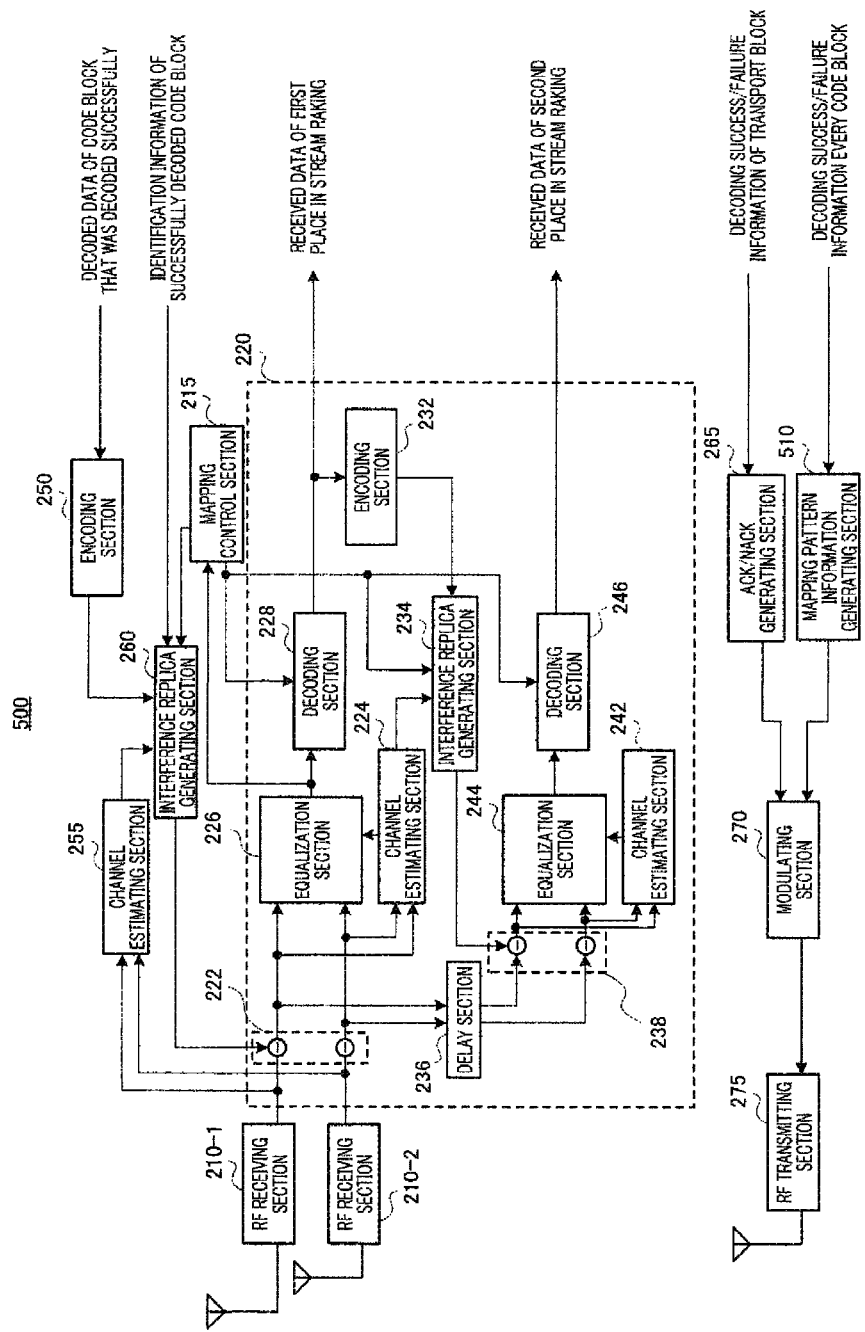
FIG. 19 is a block diagram showing a configuration of a MIMO communication apparatus on the receiving side according to Embodiment 3.

FIG. 19 is a block diagram showing a configuration of the MIMO communication apparatus on the receiving side according to Embodiment 3. In FIG. 19, MIMO communication apparatus 500 includes mapping pattern information generating section 510.

Mapping pattern information generating section 510 generates mapping pattern information based on decoding success/failure information per code block received from a CRC check section (not shown).

Figure 20:
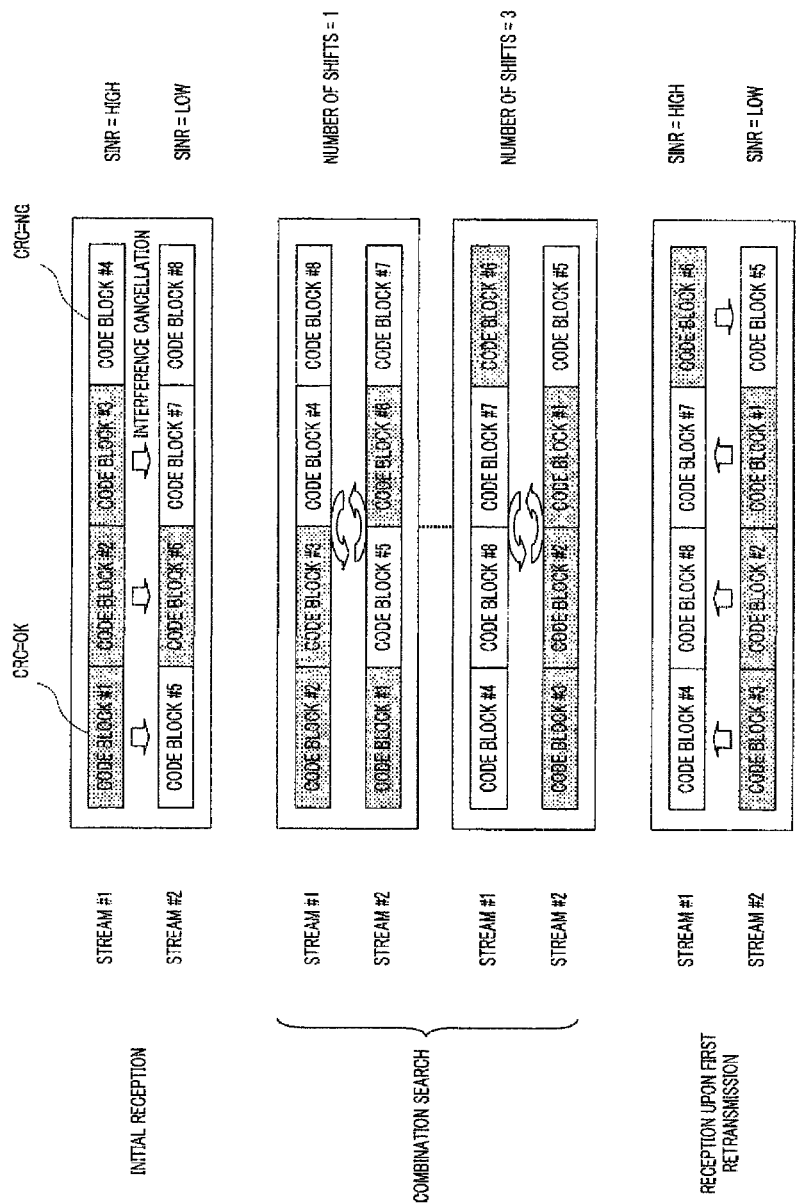
FIG. 20 illustrates a mapping pattern determining method in the mapping pattern information generating section in FIG. 19.

FIG. 20 illustrates a mapping pattern determining method in mapping pattern information generating section 510. In FIG. 20, one transport block is formed with eight code blocks.

Then, in the initial transmission, code blocks #1, #2 #3 and #4 are mapped in stream #1 in order, and code blocks #5, #6, #7 and #8 are mapped in stream #2 in order. That is, in the initial transmission, code blocks #1 and #5 form one combination, code blocks #2 and #6 form one combination, code blocks #3 and #7 form one combination, and code blocks #4 and #8 form one combination.

The transport block transmitted with this mapping pattern is received in MIMO communication apparatus 500, and a CRC check section (not shown) decides that there is no error in code blocks #1, #2, #3 and #6, and there is error in the remaining code blocks #4, #5, #7 and #8.

Mapping pattern information generating section 510 sequentially performs a "cyclic shift" of code blocks in the mapping pattern upon the initial transmission, and searches for the "best mapping pattern."

Then, the number of shifts for this best mapping pattern is transmitted as mapping pattern information.

Here, a "cyclic shift" means to shift the allocation positions of code blocks in an assumption that two streams #1 and #2 are connected at their both ends like a chain. Here, the cyclic shift direction refers to the counterclockwise direction.

Also, the "best mapping pattern" refers to the mapping pattern in which there is the largest number of combinations of a code block that was successfully decoded and a code block that was unsuccessfully decoded. Further, it is preferable to preferentially map a successfully decoded code block in a stream of lower communication quality. That is, it is preferable that the number of successfully decoded code blocks allocated to the first transmission stream (stream #1 in FIG. 20) is smaller than the number of successfully decoded code blocks allocated to a second transmission stream (stream #2 in FIG. 20) of poorer communication quality than that of the first transmission stream.

Thus, according to the present embodiment, in MIMO communication apparatus 400, mapping section 410 obtains mapping pattern information fed back from MIMO communication apparatus 500 and changes combinations of code blocks based on this mapping pattern information. This mapping pattern information refers to the number of shifts for the mapping pattern in which there is the largest number of combinations of a code block that is successfully decoded and a code block that is unsuccessfully decoded.

By this means, it is possible to increase the number of unsuccessfully decoded code blocks that can obtain interference cancellation gain, so that it is possible to increase the possibility that decoding of the unsuccessfully decoded code blocks succeeds upon a retransmission. As a result, it is possible to reduce the number of retransmissions, so that it is possible to improve the efficiency of transmission.

Figure 21:
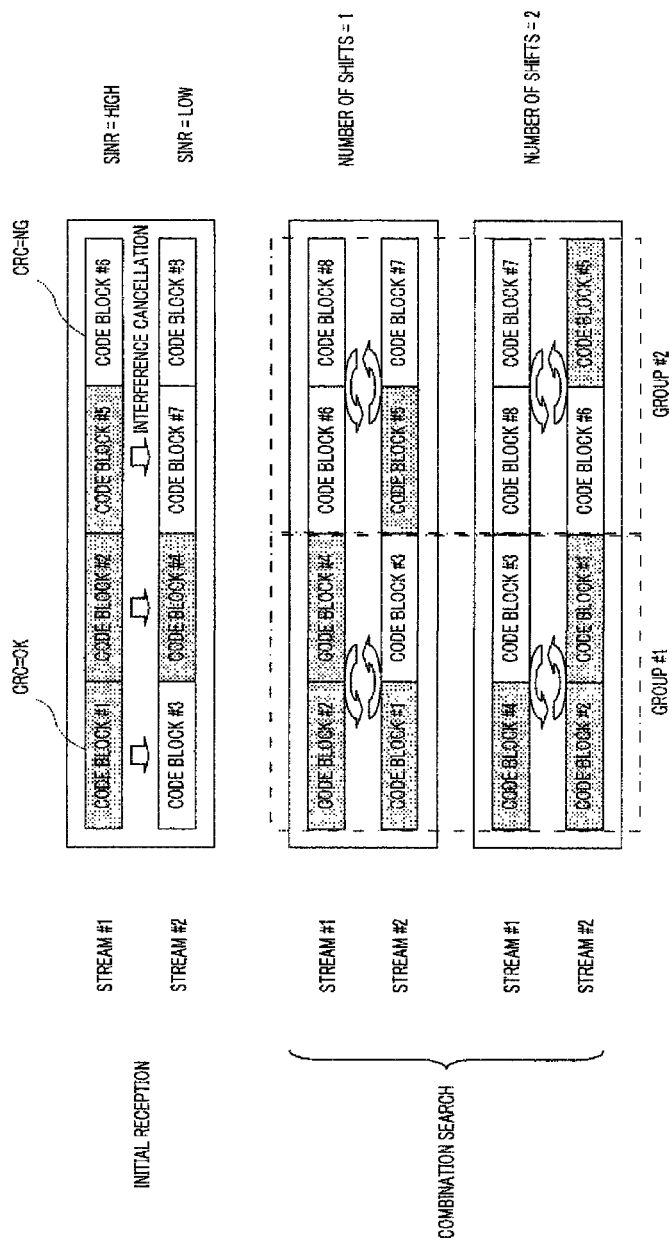
FIG. 21 shows a variation of a cyclic shift method.

Also in the above explanation, although a cyclic shift is performed over a whole transport block, the present invention is not limited to this. For example, as shown in FIG. 21, it is equally possible to divide a code block group into some groups and perform a cyclic shift in each group.

Then, mapping pattern information generating section 510 sequentially performs a cyclic shift by the same number of shifts in all groups and feeds hack, as mapping pattern information, the number of shifts in which the total sum of combinations of a code block that is successfully decoded and a code block that is unsuccessfully decoded in all groups is the largest.

By this means, the amount of shifts is limited, so that it is possible to reduce the number of shifts required for mapping pattern information.

Also it is equally possible to determine the suitable mapping pattern in each group and feed back the number of shifts in each group.

By this means, it is possible to select a more suitable combination, so that the reception performance in the receiving side improves. As a result, it is possible to reduce the number of retransmissions, so that it is possible to improve the efficiency of transmission.

Also, mapping section 410 may transmit mapping pattern information used for mapping, to MIMO communication apparatus 500.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-164756, filed on Jun. 24, 2008, including the specification, drawings and abstract, is incorporated herein by reference in its entirety.

Industrial Applicability

The MIMO transmitting apparatus, MIMO receiving apparatus, MIMO transmission signal forming method and MIMO transmission signal separating method of the present invention are useful to improve the efficiency of transmission by averaging reliability among code blocks.

The invention claimed is:

1. A MIMO (Multiple Input Multiple Output) transmitting apparatus that transmits a transport block including four or more code blocks each formed with a data sequence, using two transmission streams, the apparatus comprising:
    an encoding circuitry that forms a codeword by encoding the transport block in code block units;
    a mapping circuitry that maps the codeword in the two transmission streams in code block unit and changes, between a previous transmission and a current transmission of the transport block, a combination of code blocks in a same transmission zone in a spatial domain by cyclically shifting allocation positions of code blocks within and between the two transmission streams; and
    an obtaining circuitry that obtains mapping pattern information feedback from a receiving side of the transport block,
    wherein the mapping circuitry determines a number of shifts based on the mapping pattern information; and
    the mapping pattern information indicates the number of shifts for the mapping pattern in which there is the largest number of combinations of a code block that are decoded that was successfully decoded and a code block that was unsuccessfully decoded.

2. A MIMO (Multiple Input Multiple Output) transmitting apparatus that transmits a transport block including four or more code blocks each formed with a data sequence, using two transmission streams, the apparatus comprising:
    an encoding circuitry that forms a codeword by encoding the transport block in code block units;
    a mapping circuitry that maps the codeword in the two transmission streams in code block unit and changes, between a previous transmission and a current transmission of the transport block, a combination of code blocks in a same transmission zone in a spatial domain by cyclically shifting allocation positions of code blocks within and between the two transmission streams; and
    an obtaining circuitry that obtains mapping pattern information feedback from a receiving side of the transport block,
    wherein the mapping circuitry determines a number of shifts based on the mapping pattern information; and
    the mapping pattern information indicates a mapping pattern in which a number of code blocks that are decoded successfully in the receiving side and allocated to a first transmission stream, is smaller than a number of code blocks that are decoded successfully and allocated to a second transmission stream of poorer communication quality than that of the first transmission stream.

3. A MIMO (Multiple Input Multiple Output) receiving apparatus that separates a plurality of reception streams transmitted from a MIMO transmitting apparatus-that transmits a transport block including a plurality of code blocks each formed with a data sequence, using a plurality of transmission streams, in which a transport block including a plurality of code blocks each formed with a data sequence is mapped, into individual streams, and decodes the separated streams in code block units, the MIMO receiving apparatus comprising:
    a mapping control circuitry that decodes a received signal and outputs mapping pattern information included in the received signal;
    a channel estimating circuitry that estimates a variation in the transmission path based on known signals included in the received signals and obtains a channel estimation value;
    a forming circuitry that forms an interference replica signal for a code block that was decoded successfully, based on decoded data of that code block, the mapping pattern information and the channel estimation value; and
    a separating circuitry that that separates the plurality of reception streams that are currently received, into individual streams in order from the stream of the highest place in the stream ranking, based on the mapping pattern information, if a current transmission is the initial transmission or there is no code block that was decoded successfully before the current retransmission and removes a replica signal formed in the forming circuitry before a previous reception, from a plurality of reception streams that are currently received, and then separates these reception streams into individual streams if there is a code block decoded successfully before the current retransmission.

4. A MIMO (Multiple Input Multiple Output) transmission signal separating method of separating a plurality of reception streams formed by a MIMO transmission signal forming method, in which a transport block including a plurality of code blocks each formed with a data sequence is mapped, into individual streams, and decoding the separated streams in code block units, the MIMO transmission signal separating method comprising the steps of:
    decoding a received signal and outputting mapping pattern information included in the received signal;
    estimating a variation in the transmission path based on known signals included in the received signals and obtaining a channel estimation value;

forming an interference replica signal for a code block that was successfully decoded, based on decoded data of that code block, the mapping pattern information and the channel estimation value;

separating the plurality of reception streams that are currently received, into individual streams in order from the stream of the highest place in the stream ranking, based on the mapping pattern information, if a current transmission is the initial transmission or there is no code block decoded successfully before the current retransmission; and removing an interference replica signal formed in the forming step before a previous reception, from a plurality of reception streams that are currently received, and separating the plurality of reception streams that are currently received, from which the interference replica signal is removed, into individual streams if there is a code block decoded successfully before the current retransmission.

5. A MIMO (Multiple Input Multiple Output) transmission signal forming method comprising:

decoding a received signal and outputting mapping pattern information included in the received signal;

forming a codeword by encoding a transport block including four or more code blocks each formed with a data sequence, in code block units; and forming a MIMO signal by mapping the codeword in two transmission streams in a code block and changes, between a previous transmission and a current transmission of the transport block, a combination of code blocks in a same transmission zone in a spatial domain by cyclically shifting allocation positions of code blocks within and between the two transmission streams, wherein, in forming the MIMO signal, a number of shifts are determined based on the mapping pattern information; and the mapping pattern information indicates the number of shifts for the mapping pattern in which there is the largest number of combinations of a code block that are decoded that was successfully decoded and a code block that was unsuccessfully decoded.

6. A MIMO (Multiple Input Multiple Output) transmission signal forming method comprising:

decoding a received signal and outputting mapping pattern information included in the received signal;

forming a codeword by encoding a transport block including four or more code blocks each formed with a data sequence, in code block units; and forming a MIMO signal by mapping the codeword in the two transmission streams in code block unit and changes, between a previous transmission and a current transmission of the transport block, a combination of code blocks in a same transmission zone in a spatial domain by cyclically shifting allocation positions of code blocks within and between the two transmission streams, wherein, in forming the MIMO signal, a number of shifts are determined based on the mapping pattern information; and the mapping pattern information indicates a mapping pattern in which a number of code blocks that are decoded successfully in the receiving side and allocated to a first transmission stream, is smaller than a number of code blocks that are decoded successfully and allocated to a second transmission stream of poorer communication quality than that of the first transmission stream.

* * * * *